US012117965B2

(12) United States Patent
Xu (10) Patent No.: US 12,117,965 B2
(45) Date of Patent: Oct. 15, 2024

(54) FILE PROCESSING METHOD, APPARATUS AND DEVICE, AND READABLE STORAGE MEDIUM

(71) Applicant: INSPUR SUZHOU INTELLIGENT TECHNOLOGY CO., LTD., Jiangsu (CN)

(72) Inventor: Ruqing Xu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/261,060

(22) PCT Filed: Dec. 30, 2021

(86) PCT No.: PCT/CN2021/142854
§ 371 (c)(1),
(2) Date: Jul. 11, 2023

(87) PCT Pub. No.: WO2023/015830
PCT Pub. Date: Feb. 16, 2023

(65) Prior Publication Data
US 2024/0168921 A1    May 23, 2024

(30) Foreign Application Priority Data
Aug. 10, 2021  (CN) .......................... 202110911019.1

(51) Int. Cl.
*G06F 16/16* (2019.01)
*G06F 16/17* (2019.01)
(52) U.S. Cl.
CPC ............ *G06F 16/162* (2019.01); *G06F 16/17* (2019.01)

(58) Field of Classification Search
CPC .............................. G06F 16/162; G06F 16/17
(Continued)

(56) References Cited

U.S. PATENT DOCUMENTS

2009/0287844 A1* 11/2009 Bailey .................. H04L 69/326
709/236
2013/0073596 A1* 3/2013 Bai ....................... G06F 16/178
707/827
(Continued)

FOREIGN PATENT DOCUMENTS

CN    101547161 A    9/2009
CN    104731921 A    6/2015
(Continued)

OTHER PUBLICATIONS

International Search Report and Written Opinion received for PCT Serial No. PCT/CN2021/142854 on May 10, 2022, 10 pgs.
(Continued)

*Primary Examiner* — Shahid A Alam
(74) *Attorney, Agent, or Firm* — Merchant & Gould P.C.

(57) ABSTRACT

Provided are a file processing method, apparatus and device, and a readable storage medium. The method includes: judging whether a received file access path exists; if so, judging whether the file access path corresponds to a folder; if so, generating a folder stream, traversing the folder stream, and generating a file object corresponding to the folder stream; storing the file object in a memory, acquiring the size of a corresponding file according to the file object, detecting whether there is a file in the folder, and a size of the file is known and the file has been traversed and used, and if so, deleting, from the memory, the file object corresponding to the file; and acquiring the total size of files in the folder according to the size of each file in the folder.

18 Claims, 3 Drawing Sheets

(58) Field of Classification Search
USPC .......................................................... 707/822
See application file for complete search history.

(56) References Cited

U.S. PATENT DOCUMENTS

| | | | | |
|---|---|---|---|---|
| 2013/0275478 A1* | 10/2013 | Bai | ....................... | G06F 16/182 |
| | | | | 707/827 |
| 2014/0149370 A1* | 5/2014 | Li | ........................ | G06F 16/128 |
| | | | | 707/705 |
| 2016/0019235 A1* | 1/2016 | Bai | ....................... | G06F 16/178 |
| | | | | 707/827 |
| 2016/0366108 A1* | 12/2016 | Kamble | .................. | H04L 63/10 |

FOREIGN PATENT DOCUMENTS

| | | |
|---|---|---|
| CN | 105306531 A | 2/2016 |
| CN | 110995830 A | 4/2020 |
| CN | 112511633 A | 3/2021 |
| CN | 113360462 A | 9/2021 |
| EP | 1947599 A1 | 7/2008 |

OTHER PUBLICATIONS

Chinese Search Report received for Chinese Serial No. 2021109110191 on Sep. 10, 2021, 2 pgs.

\* cited by examiner

FILE PROCESSING METHOD, APPARATUS AND DEVICE, AND READABLE STORAGE MEDIUM

CROSS-REFERENCE TO RELATED APPLICATION

The present application is a National Stage Filing of PCT International Application No. PCT/CN2021/142854 filed on Dec. 30, 2021, which claims priority to the Chinese patent application No. 202110911019.1, filed before the China National Intellectual Property Administration (CNIPA) on Aug. 10, 2021, which is incorporated herein by reference in its entirety.

TECHNICAL FIELD

The present disclosure relates to the technical field of file processing, and more particularly, to a file processing method, apparatus and device, and a readable storage medium.

BACKGROUND

In scenarios such as AI (Artificial Intelligence) and disk size statistics, it is necessary to acquire the size of a file, so as to preset some space and the like for the file, such that there is an enough space to store the file.

At present, when statistics is performed on massive small files, all files are generally traversed at a time, a file object is generated for each file, and the file object is loaded into a memory, so as to acquire the total size of the massive small files in the memory. However, the inventor realizes that due to the relatively large number of the files, the memory of a JVM (Java Virtual Machine, Java Virtual Machine) is filled up by the performing statistics on the sizes of the files in the above mode, thus generating memory overflow, and finally, a file system is unavailable.

In summary, how to avoid memory overflow is a technical problem to be solved urgently by those skilled in the art at present.

SUMMARY

A file processing method, which includes:
receiving a file access path; when the file access path exists and the file access path corresponds to a folder, generating a folder stream according to the folder, traversing the folder stream, and generating a file object corresponding to the folder stream;
storing the file object in a memory, acquiring the size of a corresponding file according to the file object, and when it is detected that there is a file in the folder, and a size of the file is known and the file has been traversed and used, deleting, from the memory, the file object corresponding to the file; and
acquiring the total size of files in the folder according to the size of each file in the folder.

In an embodiment, before generating the folder stream according to the folder, the method further includes:
when there is a sub-folder in the folder, screening out the sub-folder from the folder.

In an embodiment, the step of generating the folder stream according to the folder, and traversing the folder stream includes:
generating the folder stream according to a file in the folder, and the file is located at the same level as the sub-folder;
generating a sub-folder stream according to files contained in the sub-folder; and
traversing the folder stream, and traversing the sub-folder stream after the traversal of the folder stream is completed.

In an embodiment, after generating the folder stream according to the folder, the method further includes:
generating an iterator according to the folder stream; and
in an embodiment, the step of traversing the folder stream includes:
traversing the folder stream by using the iterator.

In an embodiment, when it is determined that the file access path corresponds to an access file, the method further includes:
generating a file object corresponding to the access file, storing, in the memory, the file object corresponding to the access file, and acquiring the size of the access file according to the file object corresponding to the access file.

In an embodiment, the step of traversing the folder stream includes:
when a file in the folder stream is a valid file, executing the step of traversing the folder stream and generating the file object corresponding to the folder stream.

In an embodiment, when it is determined that the file access path does not exist, the method further includes:
sending a prompt of file access path error.

In an embodiment, the folder stream is generated by queuing files contained in the folder.

In an embodiment, the step of generating the file object corresponding to the folder stream includes:
sequentially reading the files contained in the folder, and once a file is read, generating the file object corresponding to the file.

A file processing apparatus, which includes:
a receiving module, configured to receive a file access path;
a first generation module, configured to, when the file access path exists and the file access path corresponds to a folder, generate a folder stream according to the folder, traverse the folder stream, and generate a file object corresponding to the folder stream;
a deletion module, configured to store the file object in a memory, acquire the size of a corresponding file according to the file object, and when it is detected that there is a file in the folder, and a size of the file is known and the file has been traversed and used, delete, from the memory, the file object corresponding to the file; and
an acquisition module, configured to acquire the total size of files in the folder according to the size of each file in the folder.

In an embodiment, the apparatus further includes:
a screening module, configured to, when there is a sub-folder in the folder, screen out the sub-folder from the folder; and
in an embodiment, the first generation module includes:
a first generation unit, configured to generate the folder stream according to a file in the folder, and the file is located at the same level as the sub-folder;
a second generation unit, configured to generate a sub-folder stream according to files contained in the sub-folder; and a traversal unit, configured to traverse the folder stream, and traverse the sub-folder stream after the traversal of the folder stream is completed.

The embodiments of the present disclosure further provide a file processing device, including a memory and one or more processors, wherein the memory stores a computer-readable instruction, and the computer-readable instruction causes, when executed by the one or more processors, the one or more processors to execute the steps of any one of the above file processing methods.

Finally, the embodiments of the present disclosure further provide one or more non-volatile computer-readable storage media storing computer-readable instructions, wherein the computer-readable instructions cause, when executed by one or more processors, the one or more processors to execute the steps of any one of the above file processing methods.

The details of one or more embodiments of the present disclosure are set forth in the following drawings and description. Other features and advantages of the present disclosure will become apparent from the description, the drawings and claims.

BRIEF DESCRIPTION OF THE DRAWINGS

To illustrate technical solutions in the embodiments of the present disclosure or in the prior art more clearly, a brief introduction on the drawings which are needed in the description of the embodiments or the prior art is given below. Apparently, the drawings in the description below are merely some of the embodiments of the present disclosure, based on which other drawings may be obtained by those ordinary skilled in the art without any creative effort.

DETAILED DESCRIPTION OF THE EMBODIMENTS

The core of the present disclosure is to provide a file processing method, apparatus and device, and a readable storage medium, so as to avoid memory overflow.

A clear and complete description of technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those ordinary skilled in the art based on the embodiments in the present disclosure without any creative effort, fall into the protection scope of the present disclosure.

Figure 1:
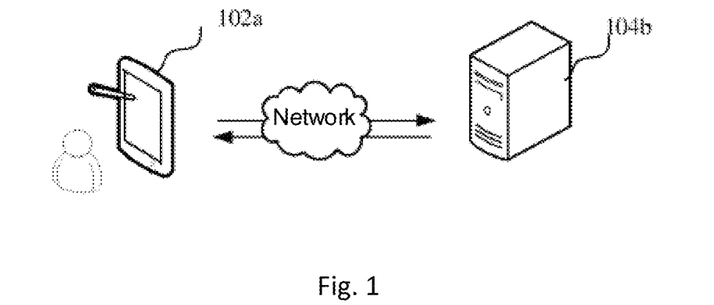
FIG. 1 is an application scenario diagram of a file processing method provided according to one or more embodiments of the present disclosure.

A file processing method provided in the present disclosure may be applied to an application environment as shown in FIG. 1. A terminal 102*a* communicates with a server 104*a* through a network. The terminal 102*a* may be, but is not limited to, various personal computers, notebook computers, smart phones, tablet computers or portable wearable devices, and the server 104*a* may be implemented by using an independent server or a server cluster composed of a plurality of servers.

In an embodiment, the terminal 102*a* may send a file access path to the server 104*a*, the server 104*a* receives the file access path, when the file access path exists and the file access path corresponds to a folder, the server 104*a* generates a folder stream according to the folder, traverses the folder stream, generates a file object corresponding to the folder stream, stores the file object in a memory, acquires the size of a corresponding file according to the file object, and when it is detected that there is a file in the folder, and a size of the file is known and the file has been traversed and used, the server 104*a* deletes, from the memory, the file object corresponding to the file; and the server 104*a* acquires the total size of files in the folder according to the size of each file in the folder.

In another embodiment, the terminal 102*a* may receive a file access path, when the file access path exists and the file access path corresponds to a folder, generates a folder stream according to the folder, traverses the folder stream, generates a file object corresponding to the folder stream, stores the file object in a memory, acquires the size of a corresponding file according to the file object, and when it is detected that there is a file in the folder, and a size of the file is known and the file has been traversed and used, deletes, from the memory, the file object corresponding to the file; and the terminal 102*a* acquires the total size of files in the folder according to the size of each file in the folder.

Figure 2:
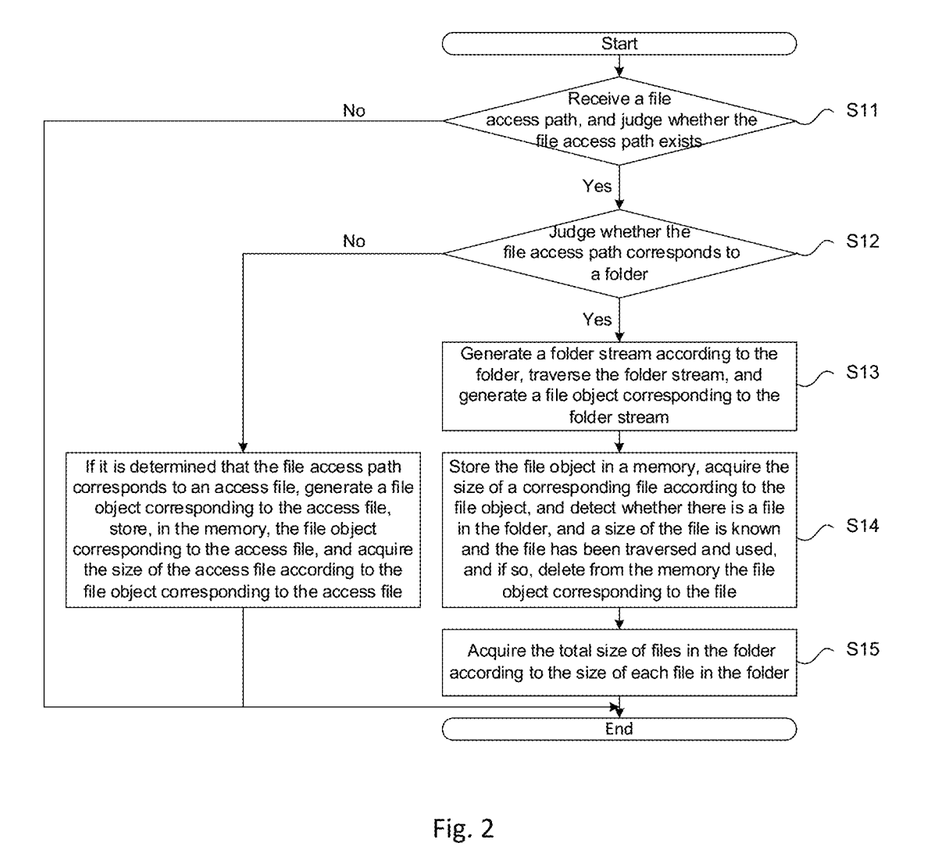
FIG. 2 is a flowchart of a file processing method provided according to one or more embodiments of the present disclosure.

Referring to FIG. 2, it shows a flowchart of a file processing method provided in an embodiment of the present disclosure, it is taken as an example for illustration that the method is applied to the terminal or server in FIG. 1, and the file processing method provided in the embodiment of the present disclosure may includes:

S11: receiving a file access path, and judging whether the file access path exists; and if so, executing step S12.

When it is necessary to acquire the sizes of massive small files, the file access path uploaded by a user may be received, and after the file access path is received, whether the file access path exists is judged by means of performing access according to the file access path and the like, and if it is determined that the file access path does not exist, a prompt may be issued, and the like; and if it is determined that the file access path exists, the step S12 may be executed, that is, statistics is performed on the sizes of the files according to the file access path.

S12: judging whether the file access path corresponds to a folder; and if so, executing step S13.

When it is determined that the file access path exists, access may be performed according to the file access path, whether the file access path corresponds to a folder or a file is judged by means of access, and if it is determined that the file access path corresponds to a file, the size of the file may be acquired.

If it is determined that the file access path corresponds to a folder, the step S13 may be executed, that is, the sizes of files in the folder may be acquired and counted.

S13: generating a folder stream according to the folder, traversing the folder stream, and generating a file object corresponding to the folder stream.

Figure 3:
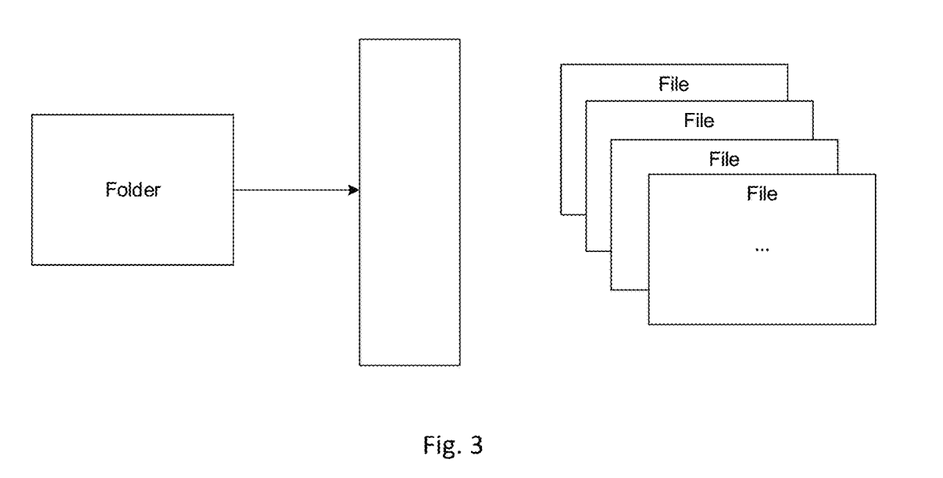
FIG. 3 is a schematic diagram of existing file traversal.
Figure 4:
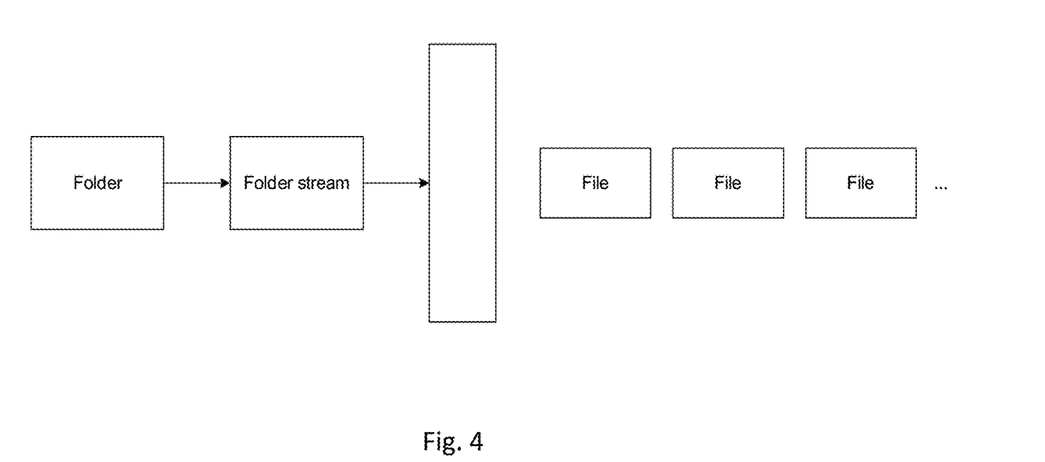
FIG. 4 is a schematic diagram of file traversal provided according to one or more embodiments of the present disclosure.

After it is determined that the file access path corresponds to the folder, the folder stream may be generated according to the folder when the folder is not empty, and the folder stream is traversed, wherein the folder stream is an interface in Java herein, and the folder stream is a stream of the folder, that is, files contained in the folder are queued, and when the folder stream is traversed, the files contained in the folder are sequentially read in the form of the stream, and the files in the folder are slowly traversed instead of reading all files at a time. Referring to FIG. 3 and FIG. 4, FIG. 3 shows a schematic diagram of existing file traversal, and FIG. 4 shows a schematic diagram of file traversal provided in an embodiment of the present disclosure. It can be seen from the drawings that, when the folder is traversed in the present disclosure, only one folder is read each time, and all files in the folder are read at a time in the prior art.

In addition, when the folder stream is traversed, the file object corresponding to the folder stream may be generated, in an embodiment, once a file is read, the file object corresponding to the file is read instead of generating file objects corresponding to all files at a time, thereby avoiding memory overflow caused by filling up the JVM memory at a time. It should be noted that, the file object contains a file attribute (for example, a file size or the like).

It should be noted that, if it is determined that the folder is empty (that is, when the folder contains no file), 0 or a prompt that the folder is empty is directly output.

S14: storing the file object in a memory, acquiring the size of a corresponding file according to the file object, and detecting whether there is a file in the folder, and a size of the file is known and the file has been traversed and used, and if so, deleting, from the memory, the file object corresponding to the file.

After the file object is generated, the file object may be stored in the memory, so that the file attribute may be acquired by checking the file object during subsequent file utilization.

In addition, the size of the file corresponding to the file object may be acquired according to the file object stored in the memory, and the size of the file is recorded and stored. Moreover, it is also possible to detect, in real time, whether there is a file in the folder, and a size of the file is known and the file has been traversed and used, if there is the file in the folder of which the size is known and which has been traversed and used, the file object corresponding to the file is deleted from the memory, so as to clear the memory in time, thereby avoiding the situation that the the file object of the file occupies the memory all the time, resulting in a greater and greater memory occupation amount, and finally leading to memory overflow. It should be noted that, having been used mentioned above refers to a state of being called by a corresponding program and used, and the known size is in an embodiment acquired according to the corresponding file object.

S15: acquiring the total size of files in the folder according to the size of each file in the folder.

After the traversal of the folder stream is completed and the sizes of all files are acquired according to all file objects, the sizes of the files in the folder may be added to acquire the total size of the files in the folder.

It can be seen from the above process that, compared with the prior art, the present disclosure has the advantages that the files are traversed in sequence in a stream manner, and the memory is cleared in time, so as to avoid the JVM memory being filled up due a large amount of files, thereby avoiding the occurrence of memory overflow as much as possible.

According to the above technical solutions disclosed by the present disclosure, during a statistical process of the total size of files, the folder stream is generated according to the folder corresponding to the file access path, and the folder stream is traversed, so that the files are traversed one by one in the stream manner, so as to avoid generating a large number of file objects at a time due to one-time traversal, thereby avoiding the memory being filled up; and moreover, by means of detecting whether there is the file in the folder of which the size is known and which has been traversed and used, and when it is determined that there is the file of which the size is known and which has been traversed and used, deleting, from the memory, the file object corresponding to the file of which the size is known and which has been traversed and used, so as to clear the memory in time, thereby avoiding the memory being filled up, and thus avoiding the occurrence of memory overflow.

According to the file processing method provided in the embodiment of the present disclosure, before generating the folder stream according to the folder, the method may further include:

judging whether there is a sub-folder in the folder, and if so, screening out the sub-folder from the folder.

In an embodiment, the terminal or the server judges whether there is a sub-folder in the folder, and when judges that there is a sub-folder in the folder, screens out the sub-folder from the folder on the basis of the judgment result.

Correspondingly, the step of generating the folder stream according to the folder, and traversing the folder stream may include:

generating the folder stream according to a file in the folder, and the file is located at the same level as the sub-folder;

generating a sub-folder stream according to files contained in the sub-folder; and traversing the folder stream, and traversing the sub-folder stream after the traversal of the folder stream is completed.

In the present disclosure, before the folder stream is generated, it may be judged whether there is a sub-folder in the folder stream, and if there is a sub-folder, the sub-folder is screened out from the folder, so as to reduce the influence of the sub-folder on the generation of the folder stream.

Figure 5:
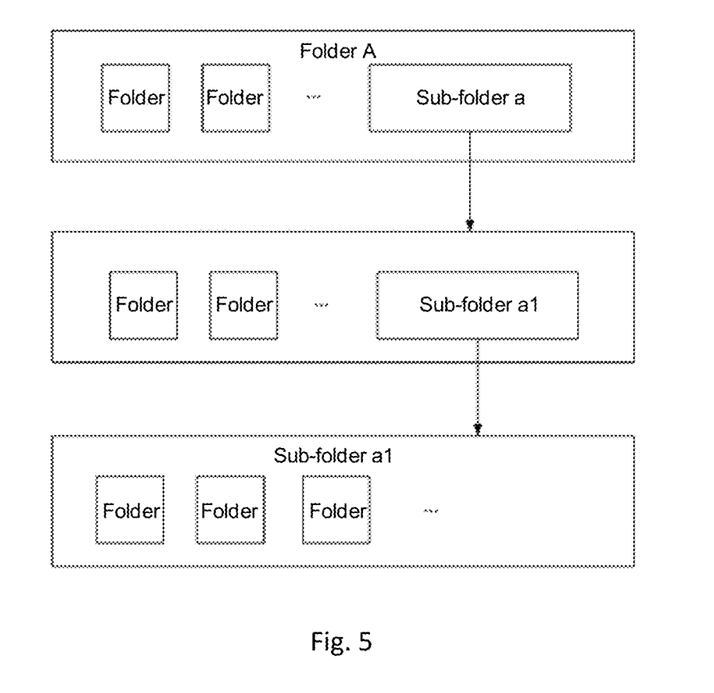
FIG. 5 is a schematic diagram of a hierarchical relationship of a folder provided according to one or more embodiments of the present disclosure.

On this basis, when the folder stream is generated, the folder stream may be generated according to the file in the folder, and the file is located at the same level as the sub-folder, wherein the same level referred to herein in an embodiment refers to sub-folders and files, which are contained in the same folder. In addition, the sub-folder stream may also be generated according to the files contained in the sub-folder. It should be noted that, if the sub-folder further includes a first sub-folder, the first sub-folder may be first screened out from the sub-folder, the sub-folder stream is generated according to a file in the sub-folder which is located at the same level as the first sub-folder, and a first sub-folder stream is generated according to files contained in the first sub-folder . . . , until only the last sub-folder has remaining files, and a corresponding sub-folder stream is generated according to the remaining files. For example: a folder A contains a sub-folder a, the sub-folder further includes a sub-folder al, at this time, the folder stream may be generated according to a file which belongs to the same level, that is, folder, as the sub-folder a, then the sub-folder stream may be generated according to a file which belongs to the sub-folder a as the sub-folder a1, and the first sub-folder stream may be generated according to the files contained in the first sub-folder a1. Specific reference may be made to FIG. 5, which shows a hierarchical relationship of a folder provided in an embodiment of the present disclosure, wherein the first row correspond to the folder A, the second row correspond to the sub-folder a contained in the folder, and the third row correspond to the files contained in the sub-folder a.

On this basis, when traversal is performed, the folder stream may be traversed at first, and after the traversal of the folder stream is completed, the sub-folder stream may be traversed, wherein if the sub-folder contains the first sub-folder, the first sub-folder stream may be traversed at last.

By means of the above process, the situation of file omission may be avoided, and a plurality of folder streams may be prevented from being traversed at a time, thereby avoiding the situation that a plurality of file objects are stored in the memory at the same time, and thus reserving a buffer time of deletion and cleaning for the memory, so as to avoid the occurrence of memory overflow as much as possible.

According to the file processing method provided in the embodiment of the present disclosure, after generating the folder stream, the method may further include:
  generating an iterator according to the folder stream; and
  correspondingly, the step of traversing the folder stream may include:
  traversing the folder stream by using the iterator.

After the folder stream is generated, the iterator may be generated according to the folder stream, so as to traverse the folder stream by using the iterator, thereby improving the traversal efficiency. The generated iterator may be in an embodiment an Iterable (which is an interface in Java), wherein the Iterable interface is one of a Java set big family, which facilitating to traverse all elements in the set, so as to iteratively access the elements in the set.

According to the file processing method provided in the embodiment of the present disclosure, if it is determined that the file access path corresponds to an access file, the method may further include:
  generating a file object corresponding to the access file, storing, in the memory, the file object corresponding to the access file, and acquiring the size of the access file according to the file object corresponding to the access file.

In the present disclosure, when it is determined that the file access path corresponds to the access file rather than the folder, the file object corresponding to the access file may be directly generated, the file object is stored in the memory, and the size of the access file is acquired according to the file object corresponding to the access file, and then the size of the access file may be output, so that related personnel may acquire the size of the file corresponding to the file access path.

According to the file processing method provided in the embodiment of the present disclosure, when the folder stream is traversed, the method may further include:
  judging whether a file in the folder stream is a valid file; and
  if so, executing the step of generating the file object corresponding to the folder stream during traversal.

In an embodiment, when it is judged that the file in the folder stream is a valid file, the step of generating the file object corresponding to the folder stream during traversal is executed on the basis of the judgment result.

When the folder stream is traversed, it is possible to further judge whether the file in the folder stream is a valid file, wherein the valid file mentioned here specifically refers to a non-shortcut file (i.e., not a shortcut), if it is determined that the file is a valid file, the step of generating the file object corresponding to the folder stream during traversal is executed, that is, the corresponding file object is generated, and if it is determined that the file is not a valid file (i.e., it is determined that the file is a shortcut connection), 0 may be directly output or processing on the file is skipped and the processing on subsequent files is continued.

By means of the above process, only the valid file may be processed, so as to reduce time waste and improve the file processing efficiency.

According to the file processing method provided in the embodiment of the present disclosure, when it is determined that the file access path does not exist, the method may further include:
  sending a prompt of file access path error.

In the present disclosure, when it is judged whether the file access path exists, if it is determined that the file access path does not exist, the prompt of file access path error may be sent, so that the related personnel may view and check the file access path according to the prompt, and then the related personnel may provide an effective file access path as soon as possible.

Figure 6:
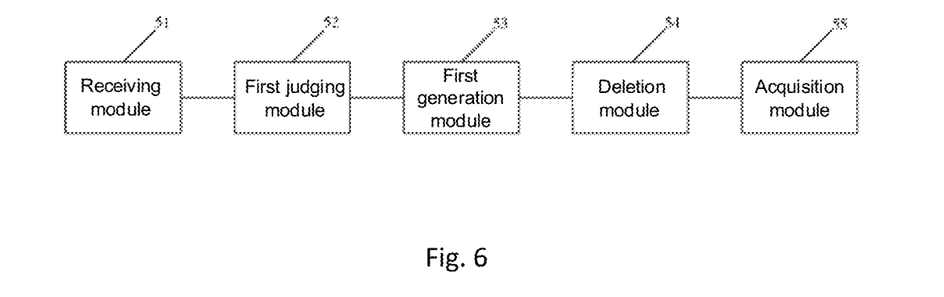
FIG. 6 is a schematic structural diagram of a file processing apparatus provided according to one or more embodiments of the present disclosure.

The embodiments of the present disclosure further provide a file processing apparatus, referring to FIG. 6, it shows a schematic structural diagram of a file processing apparatus provided in an embodiment of the present disclosure, and the file processing apparatus may include:
  a receiving module 51, configured to receive a file access path, and judge whether a file access path exists;
  a first judging module 52, configured to, if the file access path exists, judge whether the file access path corresponds to a folder;
  a first generation module 53, configured to, if the file access path corresponds to the folder, generate a folder stream according to the folder, traverse the folder stream, and generate a file object corresponding to the folder stream;
  a deletion module 55, configured to store the file object in a memory, acquire the size of a corresponding file according to the file object, detect whether there is a file in the folder, and a size of the file is known and the file has been traversed and used, and if so, delete, from the memory, the file object corresponding to the file; and
  an acquisition module 55, configured to acquire the total size of files in the folder according to the size of each file in the folder.

The file processing apparatus provided in the embodiment of the present disclosure may further include:
  a second judging module, configured to judge whether there is a sub-folder in the folder;
  a screening module, configured to, if there is a sub-folder in the folder, screen out the sub-folder from the folder;
  correspondingly, the first generation module 53 may include:
  a first generation unit, configured to generate the folder stream according to a file in the folder, and the file is located at the same level as the sub-folder;
  a second generation unit, configured to generate a sub-folder stream according to files contained in the sub-folder; and
  a first traversal unit, configured to traverse the folder stream, and traverse the sub-folder stream after the traversal of the folder stream is completed.

The file processing apparatus provided in the embodiment of the present disclosure may further include:

a second generation module, configured to generate an iterator according to the folder stream after the folder stream is generated; and correspondingly, the first generation module 53 may include:

a second traversal unit, configured to traverse the folder stream by using the iterator.

The file processing apparatus provided in the embodiment of the present disclosure may further include:

a third generation module, configured to, if it is determined that the file access path corresponds to an access file, generate a file object corresponding to the access file, store, in the memory, the file object corresponding to the access file, and acquire the size of the access file according to the file object corresponding to the access file.

The file processing apparatus provided in the embodiment of the present disclosure may further include:

a third judging module, configured to, when traversing the folder stream, judge whether a file in the folder stream is a valid file; and an execution module, configured to, if the file is a valid file, execute the step of generating the file object corresponding to the folder stream during traversal.

The file processing apparatus provided in the embodiment of the present disclosure may further include:

a prompt sending module, configured to, if it is determined that the file access path does not exist, send a prompt of file access path error.

Figure 7:
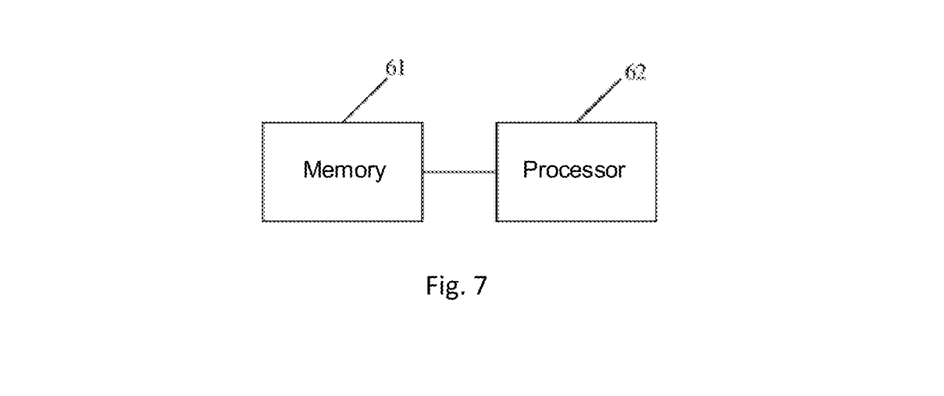
FIG. 7 is a schematic structural diagram of a file processing device provided according to one or more embodiments of the present disclosure.

The embodiments of the present disclosure further provide a file processing device, referring to FIG. 7, it shows a schematic structural diagram of a file processing device provided in an embodiment of the present disclosure, the file processing device may be a computer device, the computer device may be a terminal or a server, and the file processing device may include:

a memory 61, configured to store a computer-readable instruction; and one or more processors 62, configured to execute the computer-readable instruction stored in the memory 61, wherein the computer-readable instruction implements, when executed by the processor 62, the steps of the file processing method according to any one of the foregoing embodiments.

The embodiments of the present disclosure further provide a non-transitory readable storage medium, wherein the non-transitory readable storage medium stores a computer-readable instruction, and the computer-readable instruction may implement, when executed by one or more processors, the steps of the file processing method according to any one of the foregoing embodiments.

The readable storage medium may include a variety of media capable of storing the computer-readable instruction, such as a USB disk, a mobile hard disk, a read-only memory (Read-Only Memory, ROM), a random access memory (RAM), a magnetic disk, or an optical disc, etc.

For the description of related parts in the file processing apparatus and device, and the readable storage medium provided in the embodiments of the present disclosure, reference may be made to the detailed description of corresponding parts in the file processing method provided in the embodiments of the present disclosure, and thus details are not described herein again. Those ordinary skilled in the art may understand that all or some flows in the foregoing method embodiments may be implemented by a computer-readable instruction instructing related hardware, and the computer-readable instruction may be stored in a non-volatile computer-readable storage medium, and when executed, the computer-readable instruction may include the flows of the various foregoing method embodiments. Any reference to the memory, storage, database or other media used in the various embodiments provided in the present disclosure may include a non-volatile memory and/or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache. By way of illustration and not limitation, the RAM may be available in various forms, such as a static RAM (SRAM), a dynamic RAM (DRAM), a synchronous DRAM (SDRAM), a dual-data-rate SDRAM (DDRSDRAM), an enhanced SDRAM (ESDRAM), a synchlink (Synchlink) DRAM (SLDRAM), a memory bus (Rambus) direct RAM (RDRAM), a direct memory bus dynamic RAM (DRDRAM), and a memory bus dynamic RAM (RDRAM), etc.

It should be noted herein that, relational terms such as first, second and the like are merely used for distinguishing one entity or operation from another entity or operation, without necessarily requiring or implying that any such actual relationship or sequence exists between these entities or operations. Moreover, the terms "include", "contain" or any other variants thereof are intended to cover non-exclusive inclusions, thereby including inherent elements of a process, a method, an article, or a device that includes a series of elements. In the absence of more restrictions, an element defined by the statement "includes a" does not exclude the presence of additional identical elements in the process, the method, the article, or the device that includes the element. In addition, in the above technical solutions provided in the embodiments of the present disclosure, the part consistent with the implementation principle of the corresponding technical solution in the prior art is not described in detail, so as to avoid excessive repeated description.

The foregoing description of the disclosed embodiments enables those skilled in the art to implement or use the present disclosure. Various modifications to these embodiments will be apparent to those skilled in the art, and general principles defined herein may be implemented in other embodiments without departing from the spirit or scope of the present disclosure. Therefore, the present disclosure will not be limited to these embodiments shown herein, but conforms to the widest scope consistent with the principles and novel features disclosed herein.

What is claimed is:

1. A file processing method, comprising:

receiving a file access path;

when the file access path exists and the file access path corresponds to a folder, generating a folder stream according to the folder, traversing the folder stream, and generating a file object corresponding to the folder stream;

storing the file object in a memory, acquiring a size of a corresponding file according to the file object, and when it is detected that there is a file in the folder, and a size of the file is known and the file has been traversed and used, deleting, from the memory, the file object corresponding to the file; and acquiring a total size of files in the folder according to a size of each file in the folder;

wherein before generating the folder stream according to the folder, the method further comprises:
when there is a sub-folder in the folder, screening out the sub-folder from the folder; and
the step of generating the folder stream according to the folder and traversing the folder stream comprises:
generating the folder stream according to files in the folder, wherein the files are located at the same level as the sub-folder;
generating a sub-folder stream according to files contained in the sub-folder; and
traversing the folder stream, and traversing the sub-folder stream after the traversal of the folder stream is completed.

2. The file processing method according to claim 1, wherein after generating the folder stream according to the folder, the method further comprises:
generating an iterator according to the folder stream; and
the step of traversing the folder stream comprises:
traversing the folder stream by using the iterator.

3. The file processing method according to claim 1, wherein when it is determined that the file access path corresponds to an access file, the method further comprises:
generating a file object corresponding to the access file, storing, in the memory, the file object corresponding to the access file, and acquiring a size of the access file according to the file object corresponding to the access file.

4. The file processing method according to claim 1, wherein traversing the folder stream comprises:
when a file in the folder stream is a valid file, performing the step of traversing the folder stream and generating the file object corresponding to the folder stream.

5. The file processing method according to claim 4, wherein the valid file is a non-shortcut file.

6. The file processing method according to claim 4, when a file in the folder stream is a invalid file, skipping the invalid file and processing a next file.

7. The file processing method according to claim 6, wherein the invalid file is a shortcut file.

8. The file processing method according to claim 1, wherein when it is determined that the file access path does not exist, the method further comprises:
sending a prompt of file access path error.

9. The file processing method according to claim 1, wherein the folder stream is generated by queuing files contained in the folder.

10. The file processing method according to claim 1, wherein generating the file object corresponding to the folder stream comprises:
sequentially reading the files contained in the folder, and once a file is read, generating a file object corresponding to the file.

11. A file processing device, comprising a memory and one or more processors, wherein the memory stores computer-readable instructions, and the computer-readable instructions are configured to cause, when executed by the one or more processors, the one or more processors to:
receive a file access path;
when the file access path exists and the file access path corresponds to a folder, generate a folder stream according to the folder, traverse the folder stream, and generate a file object corresponding to the folder stream;
store the file object in a memory, acquire a size of a corresponding file according to the file object, and when it is detected that there is a file in the folder, and a size of the file is known and the file has been traversed and used, delete, from the memory, the file object corresponding to the file; and
acquire a total size of files in the folder according to a size of each file in the folder;
wherein the computer-readable instructions are further configured to cause the one or more processors to:
when there is a sub-folder in the folder, screen out the sub-folder from the folder; and
generate the folder stream according to files in the folder, wherein the files are located at the same level as the sub-folder;
generate a sub-folder stream according to files contained in the sub-folder; and
traverse the folder stream, and traverse the sub-folder stream after the traversal of the folder stream is completed.

12. The file processing device according to claim 11, wherein the computer-readable instructions are further configured to cause the one or more processors to:
generate an iterator according to the folder stream; and
traverse the folder stream by using the iterator.

13. The file processing device according to claim 11, wherein the computer-readable instructions are further configured to cause the one or more processors to:
generate a file object corresponding to the access file, store, in the memory, the file object corresponding to the access file, and acquire a size of the access file according to the file object corresponding to the access file.

14. The file processing device according to claim 11, wherein the computer-readable instructions are further configured to cause the one or more processors to:
when a file in the folder stream is a valid file, perform the step of traversing the folder stream and generating the file object corresponding to the folder stream.

15. The file processing device according to claim 11, wherein the computer-readable instructions are further configured to cause the one or more processors to:
when it is determined that the file access path does not exist, send a prompt of file access path error.

16. The file processing device according to claim 11, wherein the folder stream is generated by queuing files contained in the folder.

17. The file processing device according to claim 11, wherein the computer-readable instructions are further configured to cause the one or more processors to:
sequentially read the files contained in the folder, and once a file is read, generate a file object corresponding to the file.

18. A non-transitory computer-readable storage media storing computer-readable instructions, wherein the computer-readable instructions are configured to cause, when executed by one or more processors, the one or more processors to:
receive a file access path;
when the file access path exists and the file access path corresponds to a folder, generate a folder stream according to the folder, traverse the folder stream, and generate a file object corresponding to the folder stream;
store the file object in a memory, acquire a size of a corresponding file according to the file object, and when it is detected that there is a file in the folder, and a size of the file is known and the file has been traversed and used, delete, from the memory, the file object corresponding to the file; and acquire a total size of files in the folder according to a size of each file in the folder;

wherein the computer-readable instructions are configured to cause, when executed by one or more processors, the one or more processors to:

when there is a sub-folder in the folder, screen out the sub-folder from the folder; and generate the folder stream according to files in the folder, wherein the files are located at the same level as the sub-folder;

generate a sub-folder stream according to files contained in the sub-folder; and traverse the folder stream, and traverse the sub-folder stream after the traversal of the folder stream is completed.

* * * * *